United States Patent
Hou (10) Patent No.: US 10,944,495 B2
(45) Date of Patent: Mar. 9, 2021

(54) ANTI-INTERFERENCE METHOD AND SYSTEM (71) Applicant: ZTE CORPORATION, Guangdong (CN)

(72) Inventor: Xiaohui Hou, Guangdong (CN)

(73) Assignee: ZTE Corporation, Guangdong (CN)

( * ) Notice: Subject to any disclaimer, the term of this patent is extended or adjusted under 35 U.S.C. 154(b) by 302 days.

(21) Appl. No.: 16/090,794

(22) PCT Filed: Dec. 22, 2016

(86) PCT No.: PCT/CN2016/111472
§ 371 (c)(1),
(2) Date: Oct. 2, 2018

(87) PCT Pub. No.: WO2017/173851
PCT Pub. Date: Oct. 12, 2017

(65) Prior Publication Data
US 2020/0328835 A1 Oct. 15, 2020

(30) Foreign Application Priority Data
Apr. 8, 2016 (CN) .......................... 201610217132.9

(51) Int. Cl.
H04L 5/00 (2006.01)
H04J 11/00 (2006.01)

(52) U.S. Cl.
CPC ........ *H04J 11/0023* (2013.01); *H04L 5/0007* (2013.01); *H04L 5/0044* (2013.01); *H04J 2211/005* (2013.01)

(58) Field of Classification Search
CPC .. H04L 5/0007; H04L 5/0044; H04J 11/0023; H04J 2211/005; H04W 72/0446; H04W 72/04
See application file for complete search history.

(56) References Cited

U.S. PATENT DOCUMENTS

| 2012/0113795 A1 | 5/2012 | Ko et al. |
| 2012/0176885 A1 | 7/2012 | Lee et al. |
| 2012/0195285 A1 | 8/2012 | Ko et al. |

(Continued)

FOREIGN PATENT DOCUMENTS

| CN | 102377719 A | 3/2012 |
| CN | 102474375 A | 5/2012 |

(Continued)

OTHER PUBLICATIONS

International Search Report dated Mar. 16, 2017 for International Application No. PCT/CN2016/111472, 5 pages.

(Continued)

*Primary Examiner* — Rahel Guarino
(74) *Attorney, Agent, or Firm* — Knobbe, Martens, Olson & Bear LLP (57) ABSTRACT

Provided is an anti-interference method and system. The anti-interference method includes: setting an orthogonal code division sequence according to a subcarrier position in a frequency domain of resource elements (REs) of a data channel in at least one sub-frame; and configuring transmitting frequency domain symbols of the REs by using the orthogonal code division sequence corresponding to the subcarrier position of the REs.

19 Claims, 4 Drawing Sheets (56) References Cited

U.S. PATENT DOCUMENTS

| | | |
|---|---|---|
| 2012/0269285 A1 | 10/2012 | Jeong et al. |
| 2013/0044692 A1* | 2/2013 | Nory .................... H04L 5/0048 370/329 |
| 2014/0016609 A1 | 1/2014 | Jeong et al. |
| 2014/0347972 A1 | 11/2014 | Lee et al. |
| 2015/0085822 A1 | 3/2015 | Ko et al. |
| 2015/0110047 A1 | 4/2015 | Lee et al. |
| 2015/0222404 A1 | 8/2015 | Jeong et al. |
| 2016/0173255 A1 | 6/2016 | Lee et al. |

FOREIGN PATENT DOCUMENTS

| | | |
|---|---|---|
| CN | 102598537 A | 7/2012 |
| CN | 1025771456 A | 7/2012 |
| CN | 104506707 A | 4/2015 |

OTHER PUBLICATIONS

Written Opinion of the International Searching Authority dated Mar. 16, 2017 for International Application No. PCT/CN2016/111472, 6 pages.

* cited by examiner

ANTI-INTERFERENCE METHOD AND SYSTEM

CROSS REFERENCE TO RELATED APPLICATIONS

This is the U.S. National Phase Application, filed under 35 U.S.C. 371, of International Patent Application No. PCT/CN2016/111472, filed on Dec. 22, 2016, which claims priority to Chinese patent application No. 201610217132.9 filed on Apr. 8, 2016, the entire disclosure of each of which is incorporated herein by reference.

TECHNICAL FIELD

The present disclosure relates to the technical field of mobile communications and, for example, relates to an anti-interference method and system.

BACKGROUND

The Long Term Evolution (LTE) system is a mobile broadband communication system and has been widely used. The LTE communication system may provide users with faster and more stable network services, having the characteristic of high receiving rate, high spectrum utilization, simple receiver and the like.

The downlink channel of the LTE system is orthogonal frequency division multiple access (OFDMA), and the uplink channel is single-carrier frequency-division multiple access (SC-FDMA). These two technologies essentially take use of the orthogonalization in frequency domain.

In the multi-node networking of the LTE wireless network, different points cannot operate at completely different frequencies. When the networking is implemented with one base station and one or more adjacent base stations operating at a same frequency, the data transmission rate at the edge of a cell decreases significantly due to the existence of co-channel interference. In response to this, LTE R11, R12 and subsequent evolution versions propose inter-cell interference coordination (ICIC), enhanced inter-cell interference coordination (eICIC), coordinated multiple points transmission or reception (COMP), and other interference coordination. ICIC reduces interference through coordination in frequency domain. eICIC reduces interference through coordination in time domain. COMP makes the cell and an adjacent cell simultaneously serve user equipment (UE) at the edge of the cell and the adjacent cell through a cooperation of multiple base stations. These methods need to perform a large number of signaling interactions through an X2 interface, have performance restricted by UE measurement or base station measurement. COMP has high requirements on delay and throughput for the X2 interface.

SUMMARY

The present disclosure provides an anti-interference method and system for improving anti-interference performance of uplink and downlink common data channels of the LTE system.

An anti-interference method is provided, including:

setting an orthogonal code division sequence according to a subcarrier position in a frequency domain of resource elements (REs) of a data channel in one or more sub-frames; and configuring frequency domain transmitting symbols of the REs by using the orthogonal code division sequence corresponding to the subcarrier position of the REs.

In an embodiment, the number of the sub-frames has a value range of [1, 10].

In an embodiment, the number of the sub-frames is 1.

In an embodiment, the step of setting the orthogonal code division sequence includes: designing the orthogonal code division sequence with variable lengths, and setting the length of the orthogonal code division sequence to L; the orthogonal code division sequence being expressed as $a_L^0$, $a_L^1, \ldots, a_L^{L-1}$.

In an embodiment, the length of the orthogonal code division sequence is the 2nth power of 2, where n is greater than or equal to 0.

In an embodiment, the step of configuring the frequency domain transmitting symbols of the REs by using the orthogonal code division sequence corresponding to the subcarrier position of the REs includes:

dividing available REs on each subcarrier into groups; and configuring one or more frequency domain transmitting symbols of one or more available REs in each group by using the orthogonal code division sequence corresponding to the subcarrier position of the REs.

In an embodiment, the step of grouping the available REs on each subcarrier includes:

dividing the N available Res on one subcarrier in frequency domain into P groups, where the first group includes $L_1$ available REs, the second group includes $L_2$ available REs, . . . , and the Pth group includes $L_p$ available REs.

In an embodiment, the method further includes that: for a physical downlink shared channel (PDSCH), when a reference signal (RS) of a Long Term Evolution (LTE) system is configured with 4 antenna ports, when no RS exists, the number N of the available REs in frequency domain is 14; and when the RS exists, the number N of the available REs in frequency domain is 8.

In an embodiment, the method further includes that: for a PDSCH, when an RS of the LTE system is configured with 2 antenna ports, when no RS exists, the number N of the available REs in frequency domain is 14; and when the RS exists, the number N of the available REs in frequency domain is 10.

In an embodiment, when N is 14, the step of dividing N available REs into P groups includes: setting P to 4 and adopting a 4, 4, 4, 2 four-segment spread spectrum, where a first group includes 4 available REs, a second group includes 4 available REs, a third group includes 4 available REs, and a fourth group includes 2 available REs.

In an embodiment, when N is 8, the step of dividing N available REs into P groups includes: setting P to 2 and adopting a 4, 4 two-segment spread spectrum, where a first group includes 4 available REs, and a second group includes 4 available REs.

In an embodiment, when N is 10, the step of dividing N available REs into P groups includes: setting P to 3 and adopting a 4, 4, 2 three-segment spread spectrum, where a first group includes 4 available REs, a second group includes 4 available REs, and a third group includes 2 available REs.

In an embodiment, for a physical uplink shared channel (PUSCH), when a demodulation reference signal (DMRS) exists, the number N of the available REs in frequency domain is 12; and when the DMRS and a sounding reference signal (SRS) exist, the number N of the available REs in frequency domain is 11.

In an embodiment, when N is 12, the step of dividing N available REs into P groups includes: setting P to 3 and adopting a 4, 4, 4 three-segment spread spectrum, where a first group includes 4 available REs, a second group includes 4 available REs, and a third group includes 4 available REs.

In an embodiment, when N is 11, the step of dividing N available REs into P groups includes: setting P to 3 and adopting a 4, 4, 2 three-segment spread spectrum, where a first group includes 4 available REs, a second group includes 4 available REs, a third group includes 2 available REs, and the last available RE is not included in the spread spectrum.

In an embodiment, the frequency domain transmitting symbols of the available REs in each group are configured by using the orthogonal code division sequence corresponding to the subcarrier position of the REs in the following manner:

a constellation symbol to be transmitted of a first group is expressed as $x_1$, a constellation symbol to be transmitted of a second group is expressed as $x_2$, . . . , and a constellation symbol to be transmitted of a Pth group is expressed as $X_P$;

frequency domain transmitting symbols of available REs in the first group are $a_{L_1}^0 x_1, a_{L_1}^1 x_1, \ldots, a_{L_1}^{L_1-1} x_1$;

frequency domain transmitting symbols of available REs in the second group are a $a_{L_2}^0 x_2, a_{L_2}^1 x_2, \ldots, a_{L_2}^{L_2-1} x_2$;

. . . , and frequency domain transmitting symbols of available REs in the Pth group are $a_{L_p}^0 x_p, a_{L_p}^1 x_p, \ldots,$ and $a_{L_p}^{L_p-1} x_p$.

The present disclosure further provides an anti-interference system, including a sequence setting unit and a configuration unit.

The sequence setting unit is configured to set an orthogonal code division sequence according to a subcarrier position in a frequency domain of REs of a data channel in one or more sub-frames.

The configuration unit is configured to configure frequency domain transmitting symbols of the REs by using the orthogonal code division sequence corresponding to the subcarrier position of the REs.

The present disclosure further provides a non-transient computer-readable storage medium, which is configured to store computer-executable instructions for executing the above-mentioned method.

The present disclosure further provides an anti-interference system, including:

at least one processor; and a memory which is communicatively connected to the at least one processor;

the memory stores instructions which may be executed by the at least one processor, and the at least one processor executes the instructions to execute the above-mentioned method.

According to the present disclosure, the orthogonal code division multiplexing technology is introduced and the orthogonal code division sequence is used to perform spread spectrum on REs improving the anti-interference performance of uplink and downlink common data channels of the LTE system.

BRIEF DESCRIPTION OF DRAWINGS

The drawings are used to illustrate the present disclosure, and the exemplary embodiments and the illustrations thereof are intended to explain the present disclosure and not to constitute an improper limitation to the present disclosure.

DETAILED DESCRIPTION

The present disclosure will be described in detail in conjunction with the drawings and the embodiments. If not in collision, the following embodiments and features thereof may be combined with each other.

Figure 1:
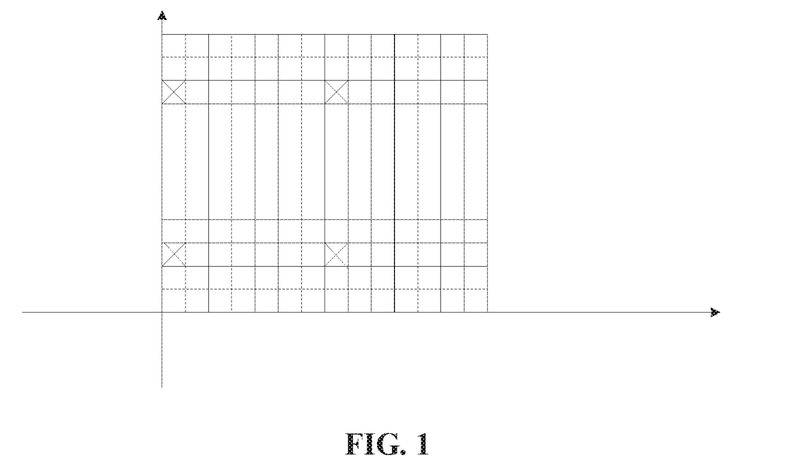
FIG. 1 is a channel structural diagram of a PDSCH when a RS is configured with 2 antenna ports according to the present disclosure.

A channel structure of a physical downlink shared channel (PDSCH) is shown in FIG. 1. The PDSCH has a reference signal (RS), a demodulation reference signal (DMRS) and the like.

Therefore, in FIG. 1, a horizontal axis represents a time domain, in units of orthogonal frequency division multiplexing (OFDM) symbols; and a vertical axis represents a frequency domain, in units of subcarriers. In a sub-frame, the multiple rows have different number of available resource elements (REs) at the same position in frequency domain (i.e., 1 OFDM symbol in time domain (1/14 ms) and 1 subcarrier (15 kHz) in frequency domain). For a normal cyclic prefix (CP) mode, when no RS exists, 14 available REs are provided; and when the RS exists, less than 14 available REs are provided. In the example illustrated in FIG. 1, 12 available REs are provided.

For the PDSCH and a physical uplink shared channel (PUSCH), the present disclosure provides an anti-interference method, which improves the anti-interference performance of uplink and downlink common data channels of the LTE system.

Figure 2:
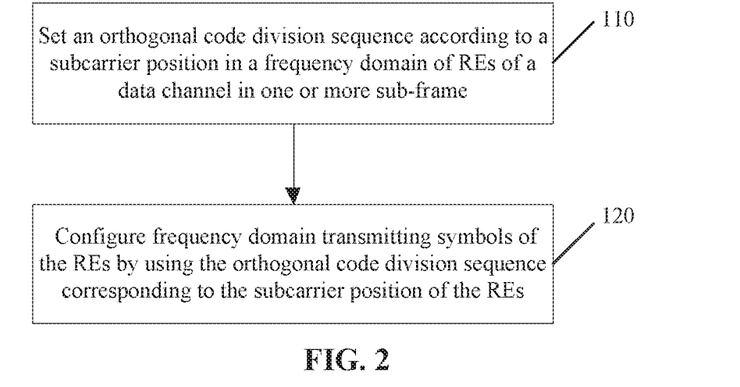
FIG. 2 is a flowchart of an anti-interference method according to the present disclosure.

As shown in FIG. 2, a flowchart of an anti-interference method in a first embodiment of the present disclosure is provided.

In step S110, an orthogonal code division sequence is set according to a subcarrier position in a frequency domain of REs of a data channel in one or more sub-frame.

In step S120, frequency domain transmitting symbols of the REs are configured by using the orthogonal code division sequence corresponding to the subcarrier position of the REs.

In the above method, the orthogonal code division sequence may be set according to the subcarrier position in the frequency domain of the REs in one sub-frame or may be set according to the subcarrier positions in the frequency domain of the REs in multiple sub-frames at the same time. The number of the sub-frames has a value range of [1, 10], and the spread spectrum may be performed on a maximum of a same subcarrier in 10 sub-frames at the same time. The reason for the maximum of 10 is that one sub-frame has a length of 1 ms, and one radio frame of the LTE system has a length of 10 ms, that is, one radio frame includes 10 sub-frames.

In the following example, the number of sub-frames for spread spectrum is 1. Of course, the number of corresponding code division sequences increases when the number of sub-frames is larger than 1. The principle is similar and will not be described again.

The step S110 in which the orthogonal code division sequence is set includes steps described below.

The orthogonal code division sequence with variable lengths is designed, the length of the orthogonal code division sequence is set to L. The orthogonal code division sequence is expressed as $a_L^0, a_L^1, \ldots, a_L^{L-1}$. The length L of the orthogonal code division sequence is the 2nth power of 2, where n is greater than or equal to 0. The length L of the orthogonal code division sequence has such a value that the code division sequence is orthogonal, and the value of L may be 2 or 4.

Figure 3:
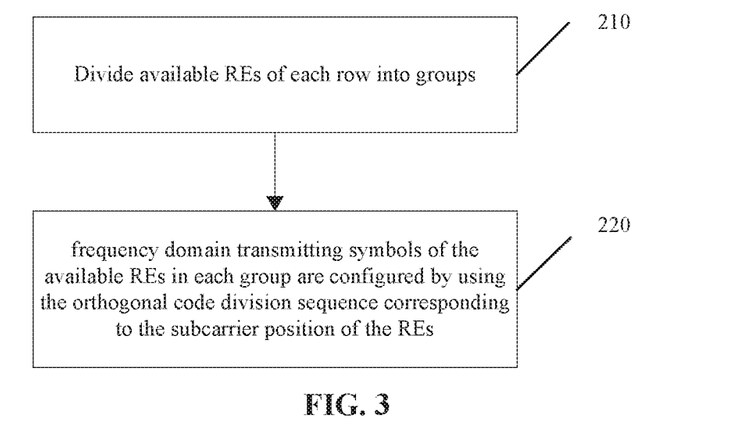
FIG. 3 is a flowchart of a method for configuring a frequency domain transmitting symbols of REs by using the orthogonal code division sequence according to the present disclosure.

FIG. 3 shows how to configure frequency domain transmitting symbols of the REs by using the orthogonal code division sequence corresponding to the subcarrier position of the REs in step S120.

In step S210, available REs of each row are divided into groups. The REs of a same row occupy a same subcarrier.

In step S220, frequency domain transmitting symbols of the available REs in each group are configured by using the orthogonal code division sequence corresponding to the subcarrier position of the REs.

The step S210 in which available REs of each row are divided into groups includes the steps described below.

The number of the available REs of a row in the frequency domain is expressed as N, and the N available REs are divided into P groups according to the requirement for high-layer transmission. Specifically, the first group includes $L_1$ available REs, the second group includes $L_2$ available REs, . . . , and the Pth group includes $L_p$ available REs. The requirement for high-layer transmission may be the rate of high-layer transmission. The higher the rate of high-layer transmission is, the fewer available REs are contained in each group of REs.

The step S220 in which frequency domain transmitting symbols of the available REs in each group are configured by using the orthogonal code division sequence corresponding to the subcarrier position of the REs is performed in a manner described below.

A constellation symbol to be transmitted of the first group is expressed as $x_1$, a constellation symbol to be transmitted of the second group is expressed as $x_2$, . . . , and a constellation symbol to be transmitted of the Pth group is expressed as $X_P$.

In this case, frequency domain transmitting symbols of the available REs in the first group are $a_{L_1}^0 x_1, a_{L_1}^1 x_1, \ldots, a_{L_1}^{L_1-1} x_1$.

Frequency domain transmitting symbols of the available REs in the second group are a $a_{L_2}^0 x_2, a_{L_2}^1 x_2, \ldots, a_{L_2}^{L_2-1} x_2$.

. . .

Frequency domain transmitting symbols of the available REs in the Pth group are $a_{L_p}^0 x_p, a_{L_p}^1 x_p, \ldots,$ and $a_{L_p}^{L_p-1} x_p$.

The above is the configuration of REs in a transmitter. In a corresponding receiver, signal modeling and demodulation may be performed. Signal modeling and demodulation in the receiver may be performed as described below.

The signal of the first group in the receiver may be modeled as $$y_{L_1}^0 = H_{L_1}^0 a_{L_1}^0 x_1 + N_{L_1}^0,$$

$$y_{L_1}^1 = H_{L_1}^1 a_{L_1}^1 x_1 + N_{L_1}^1,$$

$$\ldots$$

$$y_{L_1}^{L_1-1} = H_{L_1}^{L_1-1} a_{L_1}^{L_1-1} x_1 + N_{L_1}^{L_1-1}.$$

In the above formula, $y_{L_1}^{L_1-1}$ is a receiving signal of an available RE numbered ($L_1-1$) among $L_1$ available REs in the first group, $H_{L_1}^{L_1-1}$ is a channel tap coefficient of a radio channel of the available RE numbered ($L_1-1$) among the $L_1$ available REs in the first group, and $N_{L_1}^0, N_{L_1}^1, \ldots, N_{L_1}^{L_1-1}$ are noise.

Since the $L_1$ available REs in the first group are located at the same frequency domain position, the channel tap coefficients of the radio channel $H_{L_1}^0 = H_{L_1}^1, \ldots, = H_{L_1}^{L_1-1}$ may be considered to be approximately valid when correlation time of the channel caused by a Doppler frequency shift on the basis of the moving speed of the UE relative to a base station is greater than the length of one sub-frame, that is, 1 ms.

Each of the $L_1$ channel tap coefficients is assumed to be equal to $H_{L_1}$. Therefore, the symbol $x_1$ needs to be demodulated as below.

$$a_{L_1}^0 y_{L_1}^0 + a_{L_1}^1 y_{L_1}^1 + \ldots a_{L_1}^{L_1-1} y_{L_1}^{L_1-1} = H_{L_1} x_1$$
$$(a_{L_1}^0 a_{L_1}^0 + a_{L_1}^1 a_{L_1}^1 + \ldots a_{L_1}^{L_1-1} a_{L_1}^{L_1-1}) x_1 +$$
$$a_{L_1}^0 N_{L_1}^0 + \ldots a_{L_1}^{L_1-1} N_{L_1}^{L_1-1},$$

that is, $$a_{L_1}^0 y_{L_1}^0 + a_{L_1}^1 y_{L_1}^1 + \ldots a_{L_1}^{L_1-1} y_{L_1}^{L_1-1} == H_{L_1} x_1 \cdot 4 + N_{L_1},$$

$$\ldots$$

$$\hat{x}_1 = \frac{a_{L_1}^0 y_{L_1}^0 + a_{L_1}^1 y_{L_1}^1 + \ldots a_{L_1}^{L_1-1} y_{L_1}^{L_1-1}}{4 H_{L_1}} = x_1 + \frac{N_{L_1}}{4 H_{L_1}} \approx x_1,$$

$H_{L_1}$ may be derived from channel estimation based on the downlink RS or the DMRS.

$\hat{x}_1$ is an estimate of $x_1$.

A signal to interference plus noise ratio (SINR) is $$\frac{L_1^2 |H_{L_1}|^2}{|N_{L_1}|^2},$$

which is increased by a factor of ($L_1^2+1$) relative to the related art in which the REs in frequency domain are configured without the orthogonal code division sequence.

As an embodiment of the present disclosure, the implementation of anti-interference in PDSCH is described here.

Figure 4:
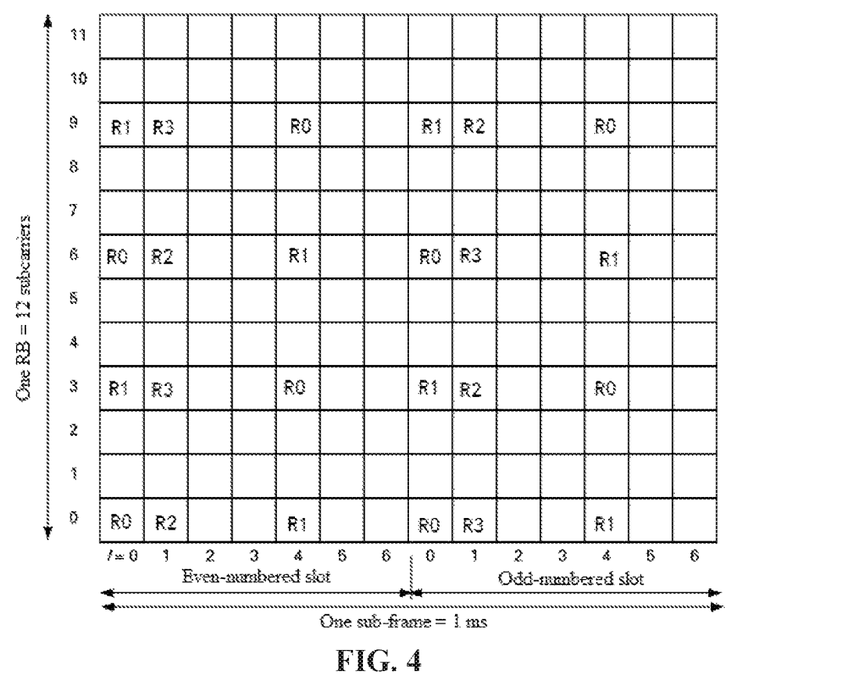
FIG. 4 is a channel structural diagram of a PDSCH when a RS is configured with 4 antenna ports according to the present disclosure.

When the RS of the LTE is configured with four antenna ports, the structure of a downlink resource block (RB) is shown in FIG. 4. R0, R1, R2 and R3 are reference signals. Two cases may exist in each row of REs, i.e., 14 or 8 available REs. When no RS exists, 14 available REs are provided; and when the RS exists, 8 available REs are provided.

Therefore, the signaling of the physical downlink control channel (PDCCH) may completely indicate the form of used code sequence in the two cases.

Figure 5:
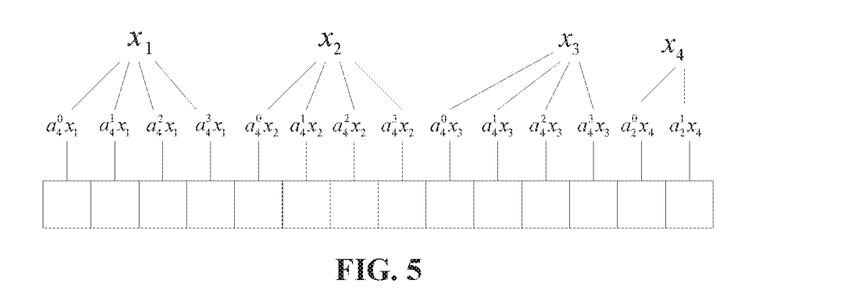
FIG. 5 is a mapping diagram of spread spectrum when N is 14 for a PDSCH according to the present disclosure.

It is assumed that for the case of 14 available REs, a code sequence with a length L of 4 and a code sequence with a length L of 2 are used for spread spectrum. The 14 available REs may be divided into 4 groups, that is, P is 4. The first three groups each have a length L of 4, and the fourth group has a length L of 2. The frequency domain transmitting symbols of the REs configured by using the orthogonal code division sequences corresponding to the subcarrier position of the REs are configured as shown in FIG. 5. It is assumed that for the case of 8 available REs, a code sequence with a length L of 4 is used for spread spectrum, and the available Res are divided two groups each having a length of 4. The signaling information may be constructed in a following form as listed in Table 1.

In implementation, an extension field may be added to a digital copyright identifier (DCI) signaling of the LTE system. For DCI, protocol 36.212 can be referred to, and the extension field is added at the end of the DCI field.

TABLE 1

| DCI signaling | |
| --- | --- |
| Total length N of REs | 1110 |
| Code sequence index 1 | 00 |
| Code sequence index 2 | 00 |
| Code sequence index 3 | 00 |
| Code sequence index 4 | 0 |
| Total length N of REs | 1000 |
| Code sequence index 1 | 01 |
| Code sequence index 2 | 01 |

For a row with a total length 14 of the available REs, the row is divided into 4 segments for spread spectrum and the spread spectrum codes are 4, 4, 4, 2, respectively. The length of the spread spectrum code sequence is followed by the index number of the code sequence. The index and the sequence table for the orthogonal code sequences with a length of 4 are listed in Table 2.

TABLE 2

| Orthogonal code sequences with a length of 4 | | | | |
| --- | --- | --- | --- | --- |
| Code sequence binary index | Orthogonal code sequence with a length of 4 | | | |
| 00 | 1 | 1 | 1 | 1 |
| 01 | 1 | −1 | 1 | −1 |
| 10 | 1 | 1 | −1 | −1 |
| 11 | 1 | −1 | −1 | 1 |

The o index and the sequence table for the orthogonal code sequences with a length of 2 are listed in Table 3.

TABLE 3

| Orthogonal code sequence with a length of 2 | | |
| --- | --- | --- |
| Code sequence binary index | Orthogonal code sequence with a length of 2 | |
| 0 | 1 | 1 |
| 1 | 1 | −1 |

According to the signaling indications in FIG. 4 and Table 1, spread spectrum is performed with a code sequence (1, −1, 1, −1) for the 0th, 3rd, 6th and 9th rows of the RB, and spread spectrum is performed with code sequences (1, 1, 1, 1) and (1, 1) for remaining rows.

Figure 6:
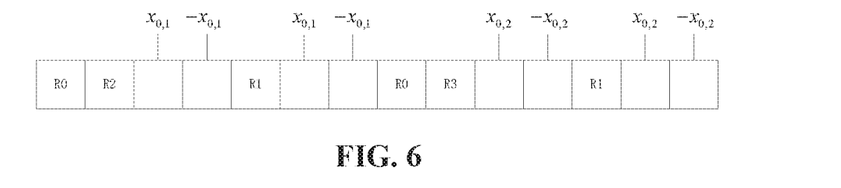
FIG. 6 is a mapping diagram of spread spectrum of a 0th row for a PDSCH according to the present disclosure.

Only the spread spectrum mapping diagrams of the 0th row and 1st row are given here, and the extension of the other rows follows the same principle. The mapping of the 0th row is shown in FIG. 6. R0, R1, R2, and R3 are reference signals, and the total length of the available REs is 8. In the positions other than the reference signals, spectrum spread is performed using the code sequence (1, −1, 1, −1), and 8 REs requires to adopt two sets of the code sequence.

Figure 7:
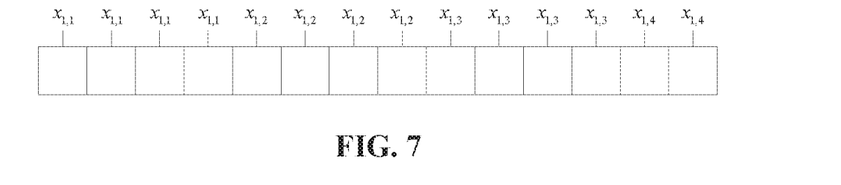
FIG. 7 is a mapping diagram of spread spectrum of a 1st row for a PDSCH according to the present disclosure.

The mapping of the 1st row is shown in FIG. 7. This row has no reference signal, the total length of the available REs is 14, and the spread spectrum is performed using three sets of code sequence (1, 1, 1, 1) and one set of code sequence (1, 1).

When the RS of the LTE is configured with two antenna ports, the structure of a downlink RB is shown in FIG. 1, where two cases may exist in each row of REs, 14 or 10 available REs. When no RS exists, 14 available REs are provided; and when RSs exist, 10 available REs are provided.

When N is 14, the principle of the spectrum spreading is the same as the principle when the RS of the LTE system is configured with four antenna ports, and will not be described again.

Figure 8:
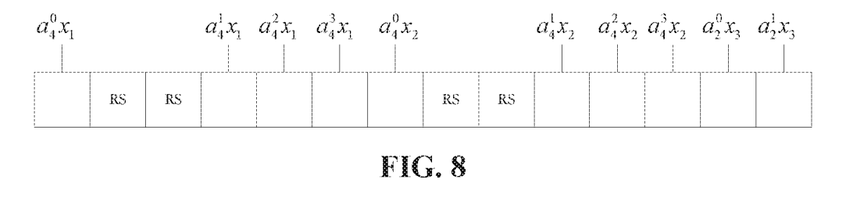
FIG. 8 is a mapping diagram of spread spectrum when N is 10 for a PDSCH according to the present disclosure.

When N is 10, according to the need for high-layer transmission, the division of the N available REs into P groups is performed in the following manner.

P is set to 3, and a 4, 4, 2 three-segment spread spectrum is adopted. The first group includes 4 available REs, the second group includes 4 available REs, and the third group includes 2 available REs. A mapping diagram for configuring frequency domain transmitting symbols of the REs by using the orthogonal code division sequences is shown in FIG. 8.

As an embodiment of the present disclosure, the implementation of anti-interference in PUSCH is described below.

Figure 9:
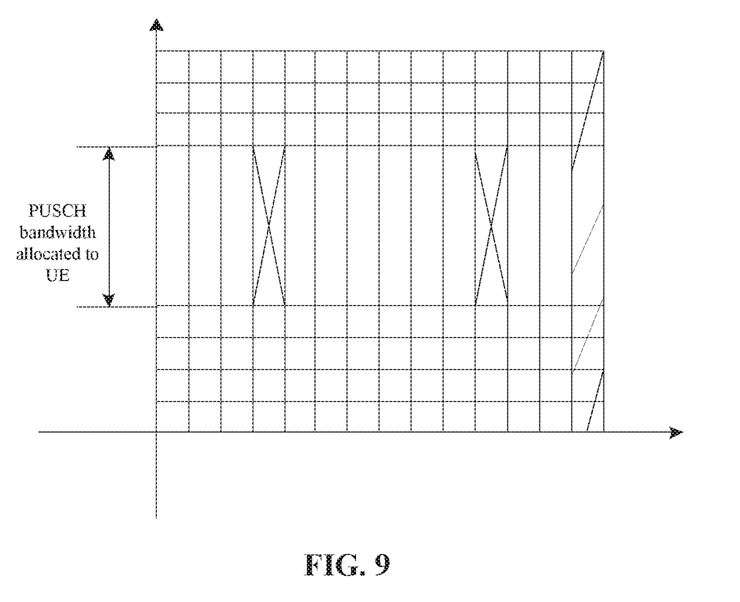
FIG. 9 is a channel structural diagram of a PUSCH according to the present disclosure.

As shown in FIG. 9, for a RB in which a user is located, when a DMRS exists, the number N of the available REs in frequency domain is 12; and when the DMRS and a sounding reference signal (SRS) exist, the number N of the available REs in frequency domain is 11.

Figure 10:
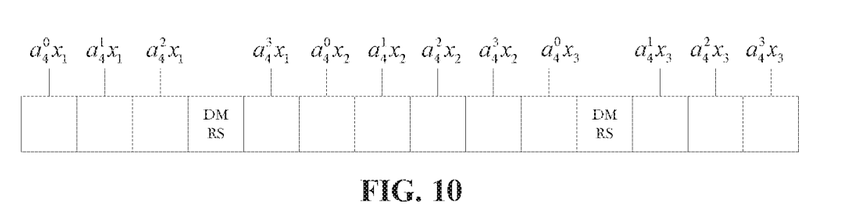
FIG. 10 is a mapping diagram of spread spectrum when N is 12 for a PDSCH according to the present disclosure.

When N is 12, according to a need for high-layer transmission, the division of the N available REs into P groups is performed in the following manner.

P is set to 3, and a 4, 4, 4 three-segment spread spectrum is adopted. The first group includes 4 available REs, the second group includes 4 available REs, and the third group includes 4 available REs. A mapping diagram for configuring frequency domain transmitting symbols of the REs by using the orthogonal code division sequences is shown in FIG. 10.

Figure 11:
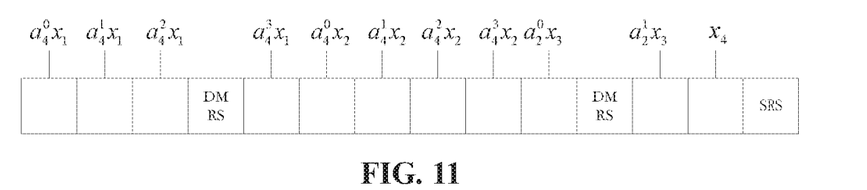
FIG. 11 is a mapping diagram of spread spectrum when N is 11 for a PDSCH according to the present disclosure.

For a row with a total length of the available REs being 11, the raw is divided into 3 segments for performing spread spectrum respectively. The length of the spread spectrum code sequences are 4, 4, 2, respectively. The first group includes 4 available REs, the second group includes 4 available REs, and the third group includes 2 available REs. A mapping diagram for configuring frequency domain transmitting symbols of the REs by using the orthogonal code division sequences is shown in FIG. 11. The length of the spread spectrum code sequence is followed by the index number of the code sequence. The DCI format is listed in Table 4.

TABLE 4

| DCI signaling | |
| --- | --- |
| Total length N of REs | 1011 |
| Code sequence index 1 | 00 |
| Code sequence index 2 | 00 |
| Code sequence index 3 | 0 |

The orthogonal code sequence index and the sequence table for the orthogonal code sequences with a length of 4 are listed in Table 2.

The orthogonal code sequence index and the sequence table for the orthogonal code sequences with a length of 2 are listed in Table 3.

The allocation of REs is performed in the order from left to right.

For other spread spectrum mechanisms, reference may be made to the implementation of anti-interference in the downlink channel PDSCH.

Figure 12:
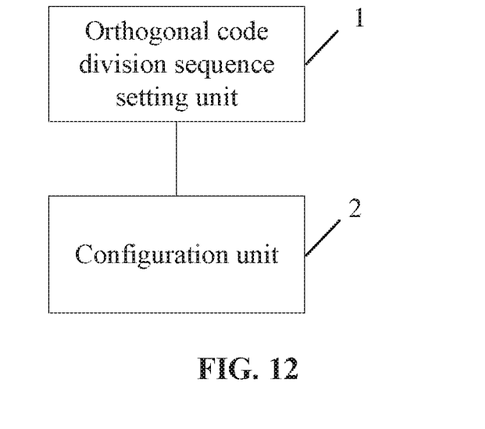
FIG. 12 is a structural diagram of an anti-interference system according to the present disclosure.

The present disclosure further provides an anti-interference system as shown in FIG. 12. The anti-interference system includes an orthogonal code division sequence setting unit 1 and a configuration unit 2.

The orthogonal code division sequence setting unit 1 is configured to set an orthogonal code division sequence according to a subcarrier position in a frequency domain of REs of REs in one or more sub-frame.

The configuration unit 2 is configured to configure frequency domain transmitting symbols of the REs by using the orthogonal code division sequence corresponding to the subcarrier position of the REs.

In the present disclosure, the orthogonal code division technology is introduced and the orthogonal code division sequence is used to perform spread spectrum on REs, improving the anti-interference performance of uplink and downlink common data channels of the LTE system.

The present disclosure further provides a non-transient computer-readable storage medium, which is configured to store computer-executable instructions for executing the method in any embodiment described above.

Figure 13:
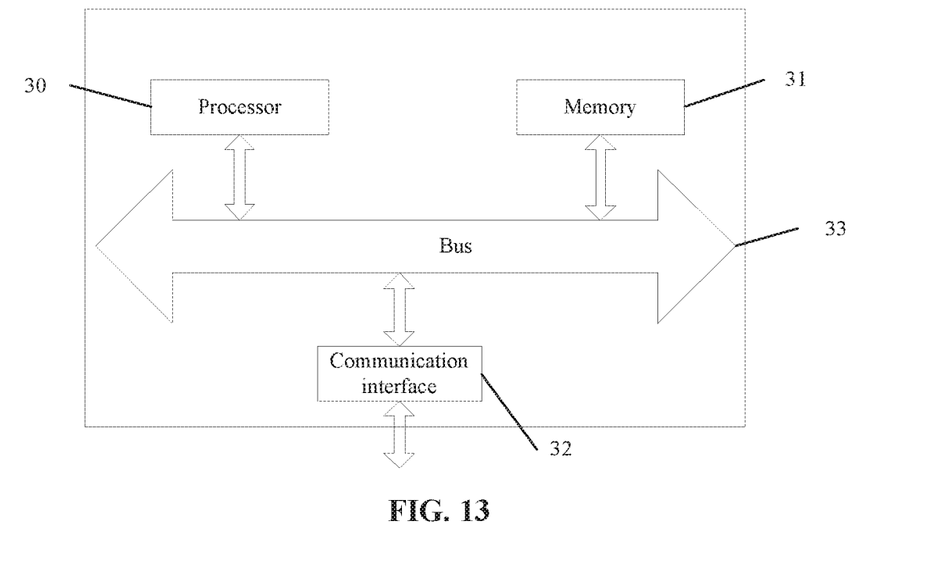
FIG. 13 is a structural diagram of hardware of the anti-interference system according to the present disclosure.

The present disclosure further provides a structural diagram of hardware of the anti-interference system. Referring to FIG. 13, the system includes at least one processor 30 and a memory. In the example as shown in FIG. 13, one processor 30 is included. The system may further include a communication interface 32 and a bus 33.

The processor 30, the communication interface 32 and the memory 31 may communicate with each other via the bus 33. The communication interface 32 may be used for information transmission. The processor 30 may call logic instructions in the memory 31 to execute the method described in the above-mentioned embodiments.

In addition, the logic instructions in the memory 31 may be implemented in the form of a software function unit and, when sold or used as an independent product, may be stored in a computer-readable storage medium.

As a computer-readable storage medium, the memory 31 may be used for storing software programs and computer-executable programs, such as program instructions or modules corresponding to the method in embodiments of the present disclosure. The processor 30 runs the software programs, instructions or modules stored in the memory 31 to execute function applications and data processing, that is, to implement the anti-interference method described in the above method embodiments.

The memory 31 may include a program storage region and a data storage region, where the program storage region may store an operating system and an application program required by at least one function; and the data storage region may store data created depending on use of a terminal device. In addition, the memory 31 may include a high-speed random access memory, and may further include a non-volatile memory.

The present disclosure may be embodied in the form of a software product that is stored in a storage medium and includes one or more instructions for enabling a computer device (which may be a personal computer, server, network device, etc.) to execute all or part of the steps of the method provided in embodiments of the present disclosure. The foregoing storage medium may be a non-transient storage medium, such as a U disk, mobile hard disk, read-only memory (ROM), random access memory (RAM), magnetic disk, optical disk or other medium that may store program codes, or may be a transient storage medium.

INDUSTRIAL APPLICABILITY

The anti-interference method and system provided by the present disclosure improve the anti-interference performance of uplink and downlink common data channels of the LTE system.

What is claimed is:

1. An anti-interference method, comprising:
   setting an orthogonal code division sequence according to a subcarrier position in a frequency domain of a plurality of resource elements (REs) of a data channel in at least one sub-frame; and
   configuring a plurality of frequency domain transmitting symbols of the REs by using the orthogonal code division sequence corresponding to the subcarrier position of the REs,
   wherein the method is performed by at least one hardware processor.

2. The method of claim 1, wherein a number of the at least one sub-frame includes a value range of [1, 10].

3. The method of claim 2, wherein the number of the at least one sub-frame is 1.

4. The method of claim 3, wherein setting the orthogonal code division sequence comprises:
   designing the orthogonal code division sequence with variable lengths, and
   setting a length of the orthogonal code division sequence to L, wherein the orthogonal code division sequence is expressed as $a_L^0, a_L^1, \ldots, a_L^{L-1}$.

5. The method of claim 4, wherein the length L of the orthogonal code division sequence is $2^{2n}$, where n is greater than or equal to 0.

6. The method of claim 4, wherein the configuring the frequency domain transmitting symbols of the REs by using the orthogonal code division sequence corresponding to the subcarrier position of the REs comprises:
   dividing a plurality of available REs on each subcarrier into a plurality of groups; and
   configuring at least one frequency domain transmitting symbol of at least one available RE in each group by using the orthogonal code division sequence corresponding to the subcarrier position of the REs.

7. The method of claim 6, wherein grouping the available REs on each subcarrier comprises:
   dividing a number N of the available REs on one subcarrier in frequency domain into P groups, wherein a first group comprises $L_1$ available REs, a second group comprises $L_2$ available REs, . . . , and a Pth group comprises $L_p$ available REs.

8. The method of claim 7, wherein for a physical downlink shared channel (PDSCH), when a reference signal (RS) of a Long Term Evolution (LTE) system is configured with 4 antenna ports,
   when no RS exists, the number N of the available REs in frequency domain is 14, and
   when the RS exists, the number N of the available REs in frequency domain is 8.

9. The method of claim 7, wherein for a PDSCH, when an RS of an LTE system is configured with 2 antenna ports,
   when no RS exists, the number N of the available REs in frequency domain is 14, and
   when the RS exists, the number N of the available REs in frequency domain is 10.

10. The method of claim 8, wherein when N is 14, dividing the N available REs into P groups comprises:
   setting P to 4 and adopting a 4, 4, 4, 2 four-segment spread spectrum, wherein a first group comprises 4 available REs, a second group comprises 4 available REs, a third group comprises 4 available REs, and a fourth group comprises 2 available REs.

11. The method of claim 8, wherein when N is 8, dividing the N available REs into P groups comprises:
   setting P to 2 and adopting a 4, 4 two-segment spread spectrum, wherein a first group comprises 4 available REs, and a second group comprises 4 available REs.

12. The method of claim 9, wherein when N is 10, dividing the N available REs into P groups comprises:
   setting P to 3 and adopting a 4, 4, 2 three-segment spread spectrum, wherein a first group comprises 4 available REs, a second group comprises 4 available REs, and a third group comprises 2 available REs.

13. The method of claim 7, wherein for a physical uplink shared channel (PUSCH),
   when a demodulation reference signal (DMRS) exists, the number N of the available REs in frequency domain is 12, and
   when the DMRS and a sounding reference signal (SRS) exist, the number N of the available REs in frequency domain is 11.

14. The method of claim 13, wherein when N is 12, dividing the N available REs into P groups comprises:
   setting P to 3 and adopting a 4, 4, 4 three-segment spread spectrum, wherein a first group comprises 4 available REs, a second group comprises 4 available REs, and a third group comprises 4 available REs.

15. The method of claim 13, wherein when N is 11, dividing the N available REs into P groups comprises:
   setting P to 3 and adopting a 4, 4, 2 three-segment spread spectrum, wherein a first group comprises 4 available REs, a second group comprises 4 available REs, a third group comprises 2 available REs, and a last available RE is not included in the spread spectrum.

16. The method of claim 6, wherein the at least one frequency domain transmitting symbol of the at least one available RE in each group is configured by using the orthogonal code division sequences corresponding to the subcarrier position of the available REs in the following manner:
   a constellation symbol to be transmitted of a first group is expressed as $x_1$, a constellation symbol to be transmitted of a second group is expressed as $x_2$, . . . , and a constellation symbol to be transmitted of a Pth group is expressed as $X_P$;
   frequency domain transmitting symbols of available REs in the first group are $a_{L_1}^0 x_1, a_{L_1}^1 x_1, \ldots,$ and $a_{L_1}^{L_1-1} x_1$;
   frequency domain transmitting symbols of available REs in the second group are $a_{L_2}^0 x_2, a_{L_2}^1 x_2, \ldots,$ and $a_{L_2}^{L_2-1} x_2$;
   . . . ,
   and frequency domain transmitting symbols of available REs in the Pth group are $a_{L_p}^0 x_p, a_{L_p}^1 x_p, \ldots,$ and $a_{L_p}^{L_p-1} x_p$.

17. An anti-interference system, comprising:
   a sequence setter configured to set an orthogonal code division sequence according to a subcarrier position in a frequency domain of a plurality of resource elements (REs) of a data channel in at least one sub-frame; and
   a configurer configured to configure a plurality of transmitting frequency domain symbols of the REs by using the orthogonal code division sequence corresponding to the subcarrier position of the REs.

18. A non-transitory computer-readable storage medium, which is configured to store computer-executable instructions that, when executed by a processor, cause the processor to perform an anti-interference method comprising:
   setting an orthogonal code division sequence according to a subcarrier position in a frequency domain of a plurality of resource elements (REs) of a data channel in at least one sub-frame; and
   configuring a plurality of frequency domain transmitting symbols of the REs by using the orthogonal code division sequence corresponding to the subcarrier position of the REs.

19. The method of claim 9, wherein when N is 14, dividing the N available REs into P groups comprises:
   setting P to 4 and adopting a 4, 4, 4, 2 four-segment spread spectrum, wherein a first group comprises 4 available REs, a second group comprises 4 available REs, a third group comprises 4 available REs, and a fourth group comprises 2 available REs.

* * * * *